United States Patent
Chen

(10) Patent No.: US 10,647,259 B2
(45) Date of Patent: May 12, 2020

(54) REARVIEW MIRROR STRUCTURE FOR VEHICLE

(71) Applicant: Chiung-Yao Chen, Taichung (TW)

(72) Inventor: Chiung-Yao Chen, Taichung (TW)

(*) Notice: Subject to any disclaimer, the term of this patent is extended or adjusted under 35 U.S.C. 154(b) by 202 days.

(21) Appl. No.: 15/800,272

(22) Filed: Nov. 1, 2017

(65) Prior Publication Data

US 2019/0126828 A1    May 2, 2019

(51) Int. Cl.
*B60R 1/06* (2006.01)
*G02B 7/182* (2006.01)
*B62J 29/00* (2006.01)

(52) U.S. Cl.
CPC ............. *B60R 1/06* (2013.01); *B62J 29/00* (2013.01); *G02B 7/1821* (2013.01); *G02B 7/1824* (2013.01)

(58) Field of Classification Search
CPC .. B60R 1/06; B60R 1/00; B60R 1/072; B60R 1/078; G02B 7/1821
USPC ................................................. 359/844, 872
See application file for complete search history.

(56) References Cited

U.S. PATENT DOCUMENTS

| 6,955,437 | B1 * | 10/2005 | Roberts | B60D 1/36 248/467 |
| 8,459,810 | B2 * | 6/2013 | Wu | B62J 29/00 359/842 |
| 2008/0239532 | A1 * | 10/2008 | Wu | B60R 1/078 359/872 |

* cited by examiner

*Primary Examiner* — Jade R Chwasz
(74) *Attorney, Agent, or Firm* — Alan D. Kamrath; Karin L. Williams; Mayer & Williams PC

(57) ABSTRACT

A rearview mirror structure for vehicle contains: a fixing mount, a rotation unit, a mirror, and a first locking bolt. The fixing mount includes a first connection tab, a second connection tab, and a fixer. The first connection tab has a through orifice, and the second connection tab has a threaded orifice. The rotation unit includes a rotatable seat and at least one abutting element, wherein the rotatable seat has a rotating portion and a connecting portion, and the rotating portion has a first aperture and at least one accommodation groove, wherein the connecting portion has a trough, and the at least one abutting element has a forcing portion with a second aperture. The mirror includes a post having a peripheral trench. The first locking bolt is screwed with the threaded orifice via the through orifice, the first aperture, and the second aperture.

5 Claims, 13 Drawing Sheets

A-A

REARVIEW MIRROR STRUCTURE FOR VEHICLE

BACKGROUND OF THE INVENTION

Field of the Invention

The present invention relates to a vehicle, and more particularly to a rearview mirror structure for vehicle which enhances an adjustable angle range and is secured on a vehicle firmly.

Description of the Prior Art

A conventional rearview mirror is applied to view road situation behind vehicle as changing lane or making a turn, thus driving the vehicle safely.

The rearview mirror contains a body connecting with a first end of a support post by using a spherical holder, and a second end of the support post connects with a connection sleeve mounted on a hollow tube of the vehicle. However, the rearview mirror is rotated to a desired angle by way of the spherical holder limitedly and is not fixed firmly (i.e., the rearview mirror moves its angle as the vehicle runs), thus having using inconvenience.

The present invention has arisen to mitigate and/or obviate the afore-described disadvantages.

SUMMARY OF THE INVENTION

The primary objective of the present invention is to provide a rearview mirror structure for vehicle in which a first locking bolt is rotated tightly or loosely so that a first connection tab and a second connection tab of a fixing mount move close to each other to force a rotation unit, thus fixing or adjustably rotating the rotation unit and the fixing mount; a forcing portion of each abutting element contacts with a peripheral trench of a post of a mirror, thus fixing or adjustably rotating the mirror and the rotation unit easily.

Further objective of the present invention is to provide a rearview mirror structure for vehicle in which the first locking bolt is rotated tightly or loosely to fix or adjustably rotate the rearview mirror structure, thus saving an operation space and a size of the rearview mirror structure.

Another objective of the present invention is to provide a rearview mirror structure for vehicle in which the first locking bolt is rotated loosely so as to adjustably rotate an angle of the rotation unit and the mirror and an angle of the mirror, thus increasing an adjustable angle range of the rearview mirror structure; thereafter, the first locking bolt is rotated tightly so as to secure the mirror stably during the vehicle runs.

To achieve above-mentioned objectives, a rearview mirror structure for vehicle provided by the present invention contains: a fixing mount, a rotation unit, a mirror, and a first locking bolt.

The fixing mount includes a first connection tab and a second connection tab which are formed on a first end of the fixing mount, the first connection tab has a through orifice, and the second connection tab has a threaded orifice corresponding to the through orifice, the fixing mount further includes a fixer mounted on a second end of the fixing mount so as to insert the fixing mount into the hollow tube.

The rotation unit is rotatably connected with the first connection tab and the second connection tab of the fixing mount, and the rotation unit includes a rotatable seat and at least one abutting element, wherein the rotatable seat has a rotating portion and a connecting portion connecting with the rotating portion, and the rotating portion has a first aperture and at least one accommodation groove defined on at least one side of the rotating portion, wherein the connecting portion has a trough defined in an end thereof and communicating with the accommodation groove, and the at least one abutting element is fitted in the accommodation groove, wherein each of the at least one abutting element has a forcing portion corresponding to the trough, and the forcing portion retains with the trough and has a second aperture corresponding to the first aperture.

The mirror includes a post extending outwardly from a side of the mirror, and the post has a peripheral trench and accommodated in the trough of the connecting portion of the rotatable seat so that the forcing portion matingly contacts with the peripheral trench.

The first locking bolt is screwed with the threaded orifice of the second connection tab of the fixing mount via the through orifice of the first connection tab of the fixing mount, the first aperture of the rotating portion of the rotatable seat, and the second aperture of each abutting element, hence when the first locking bolt is rotated tightly, it drives the first connection tab and the second connection tab of the fixing mount to move close to each other so that the first connection tab and the second connection tab force the rotation unit, thus fixing or adjustably rotating the rotation unit and the fixing mount. Each abutting element is driven by the first connection tab or the second connection tab to contact with the peripheral trench of the post of the mirror by using the forcing portion, thus fixing or adjustably rotating the mirror and the rotation unit together.

DETAILED DESCRIPTION OF THE PREFERRED EMBODIMENTS

The present invention will be clearer from the following description when viewed together with the accompanying drawings, which show, for purpose of illustrations only, a preferred embodiment in accordance with the present invention.

A rearview mirror structure for vehicle in accordance with a first embodiment of the present invention comprises: a fixing mount 10, a rotation unit 20, a mirror 30, and a first locking bolt 40.

Figure 1:
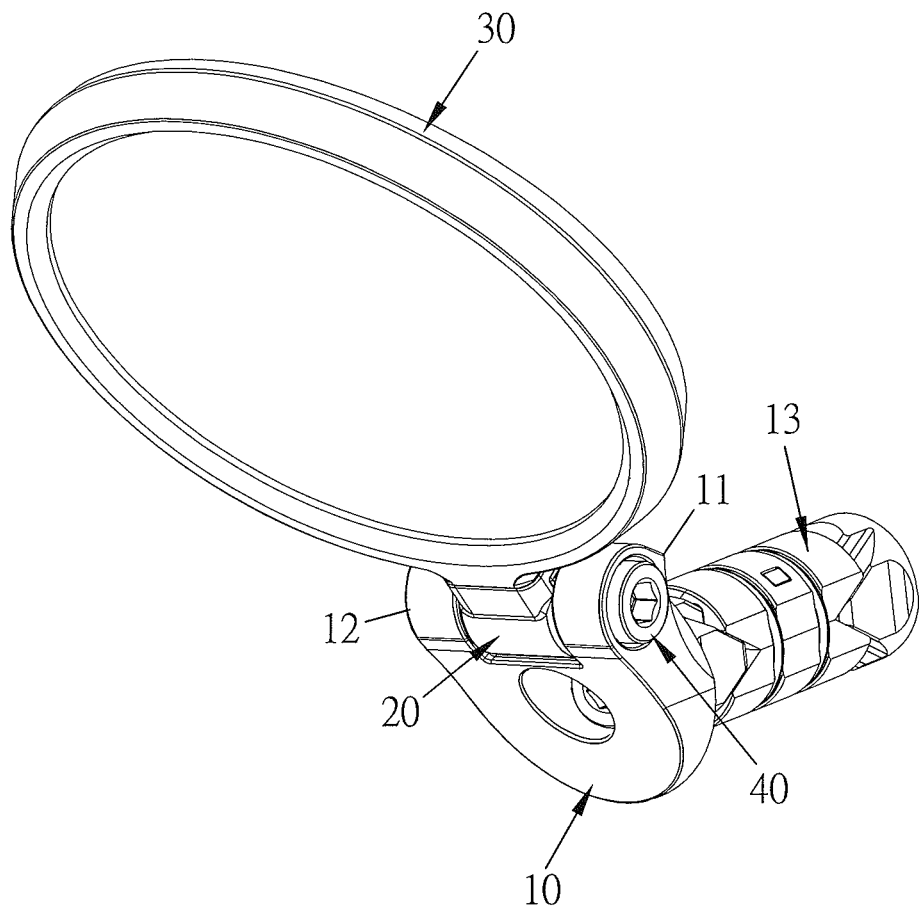
FIG. 1 is a perspective view showing the assembly of a rearview mirror structure for vehicle in accordance with a first embodiment of the present invention.
Figure 2:
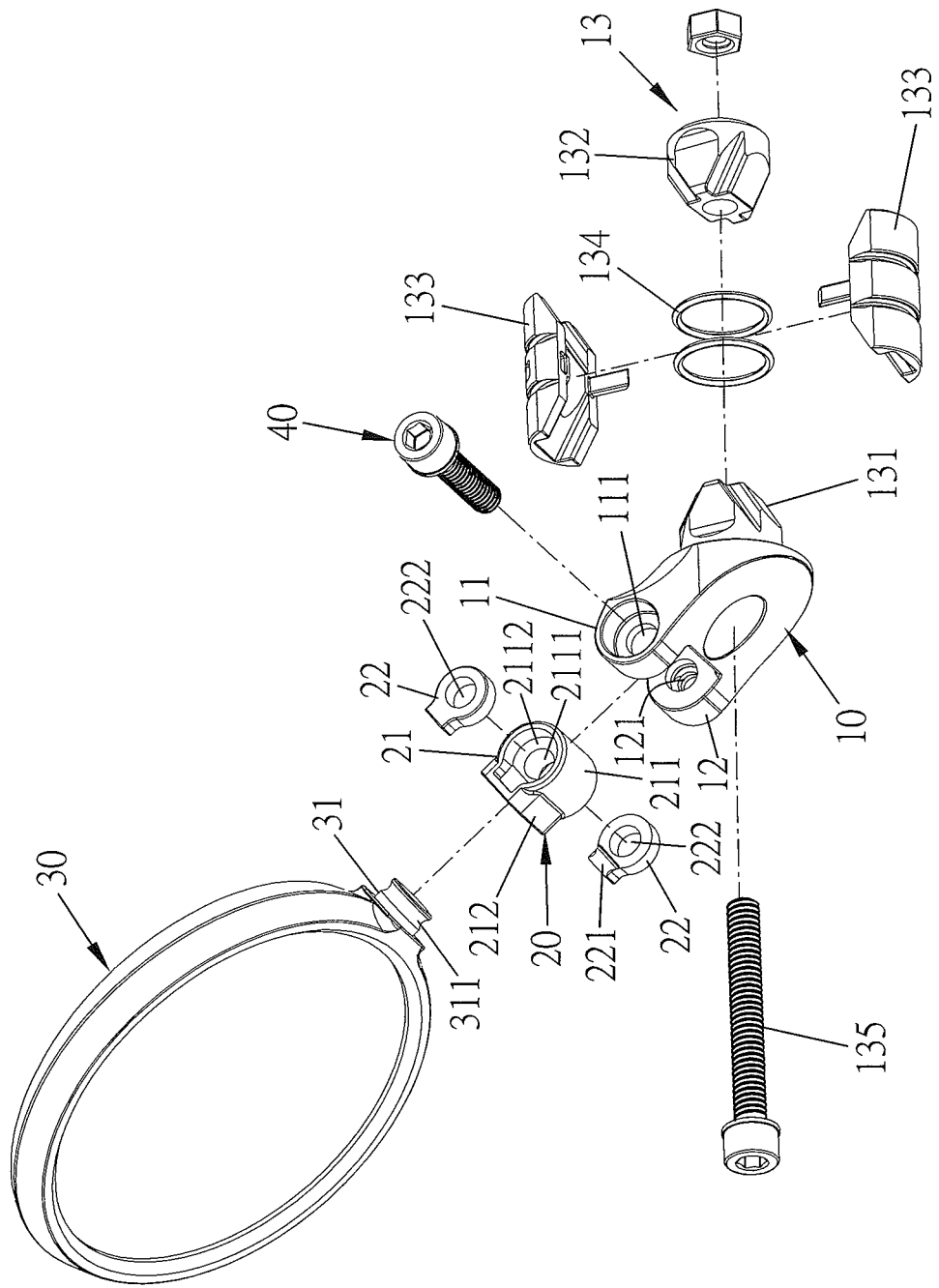
FIG. 2 is a perspective view showing the exploded components of the rearview mirror structure for the vehicle in accordance with the first embodiment of the present invention.
Figure 3:
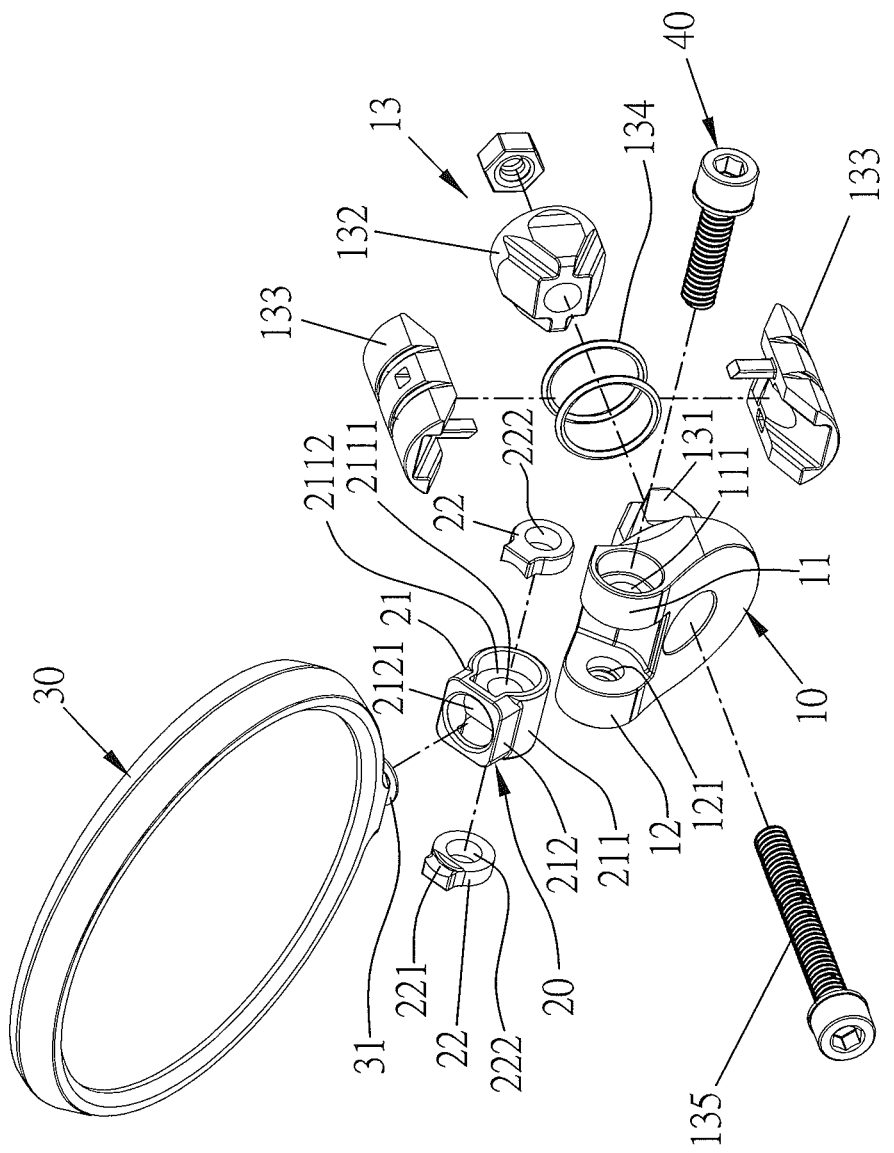
FIG. 3 is another perspective view showing the exploded components of the rearview mirror structure for the vehicle in accordance with the first embodiment of the present invention.
Figure 4:
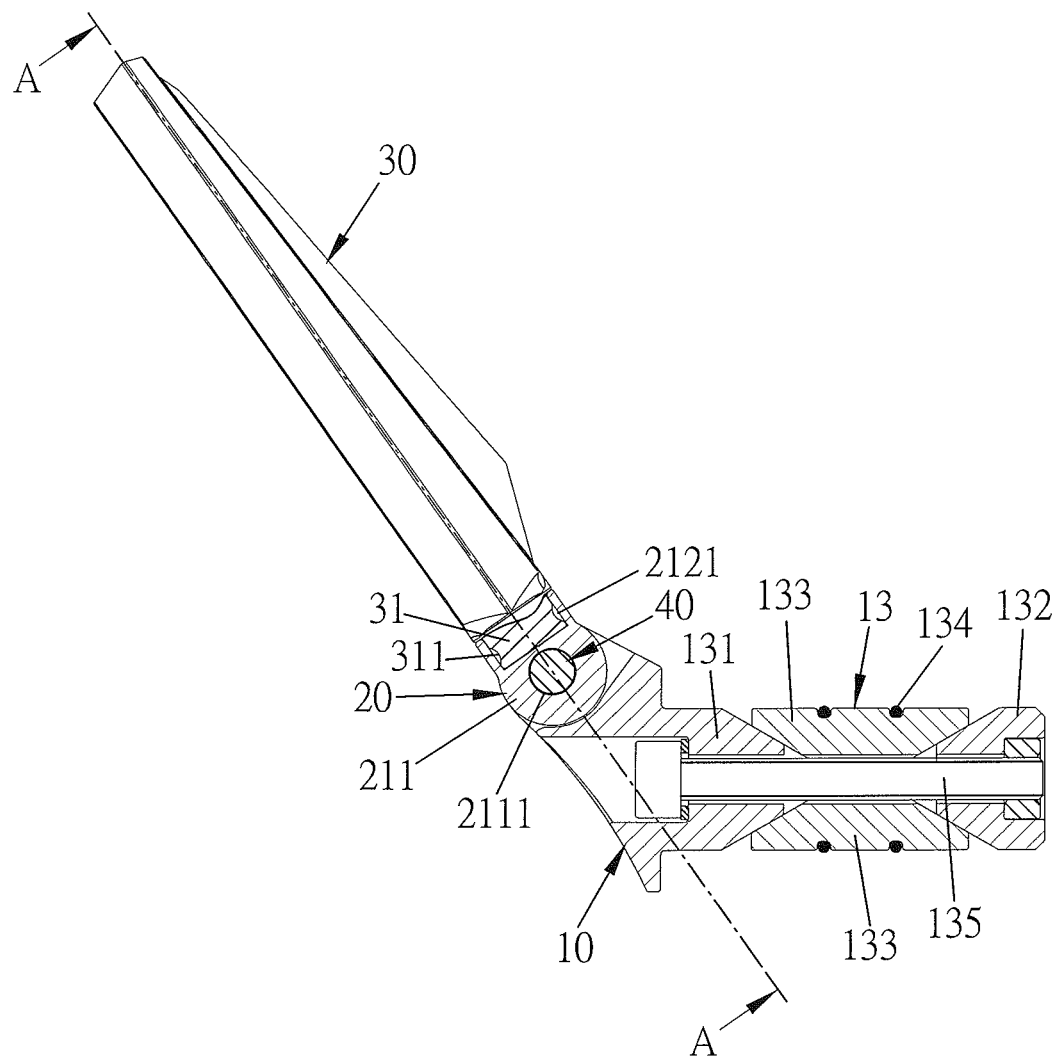
FIG. 4 is a cross sectional view showing the assembly of the rearview mirror structure for the vehicle in accordance with the first embodiment of the present invention.
Figure 5:
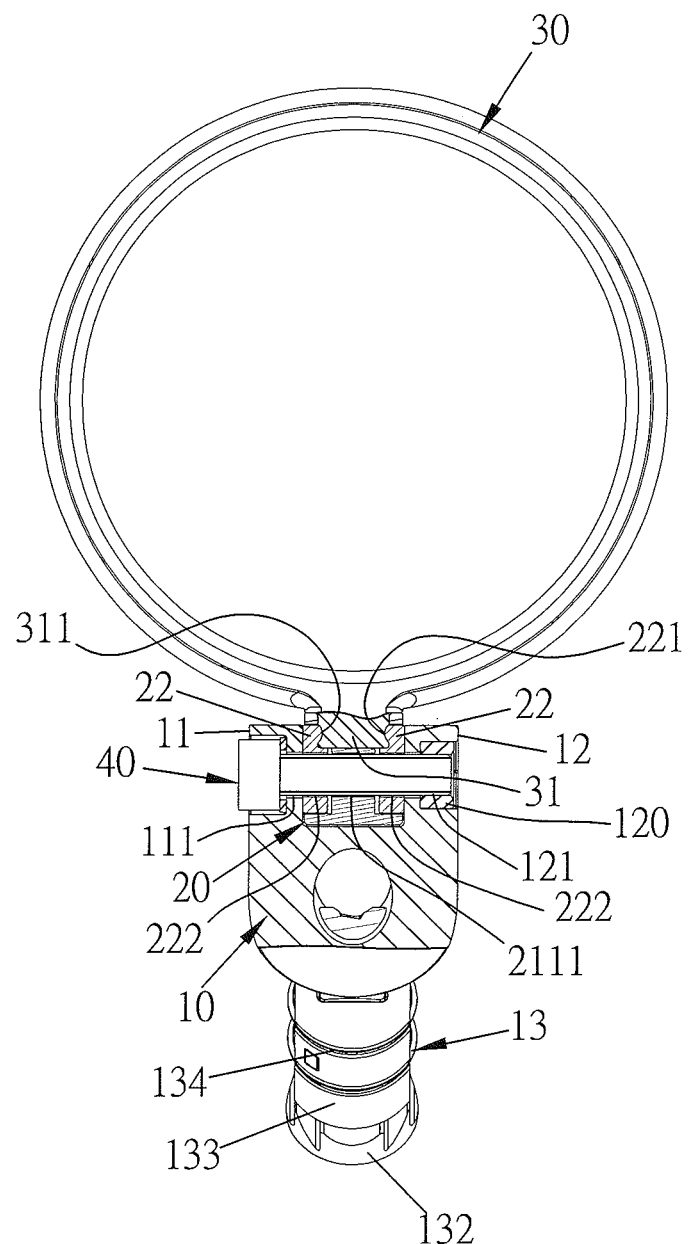
FIG. 5 is a cross sectional view taken along the line of A-A of FIG. 4.
Figure 5A:
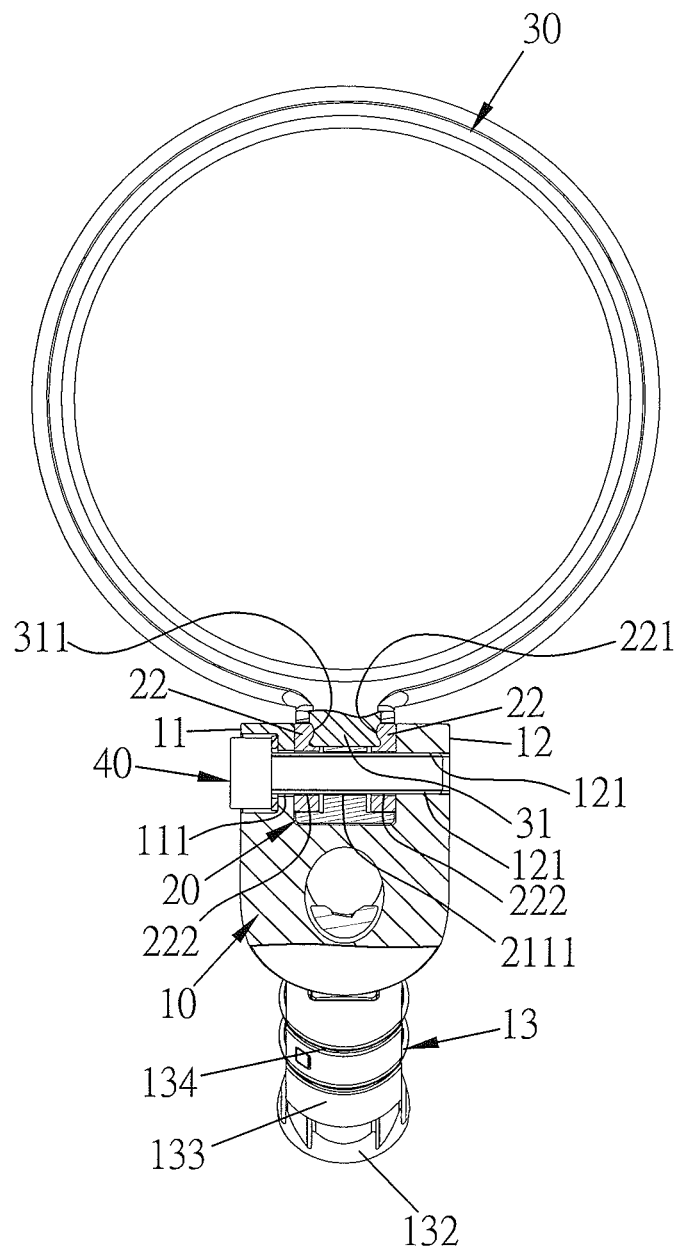
FIG. 5A is a perspective view showing the assembly of the rearview mirror structure for the vehicle in accordance with a second embodiment of the present invention.

The fixing mount 10 includes a first connection tab 11 and a second connection tab 12 which are formed on a first end of the fixing mount 10, wherein the first connection tab 11 has a through orifice 111, and the second connection tab 12 has a threaded orifice 121 corresponding to the through orifice 111, wherein the threaded orifice 121 forms in a screw nut 120 (as shown in FIG. 5) which is accommodated in the second connection tab 12 or is one-piece formed in the second connection tab 12 (as shown in FIG. 5A) in a second embodiment of the present invention. The fixing mount 10 further includes a fixer 13 mounted on a second end thereof, and the fixer 13 has a coupling portion 131 one-piece formed with the fixing mount 10, a coupling sleeve 132, two flexible fitting elements 133 which are defined between the coupling portion 131 and the coupling sleeve 132 and are fitted with each other, two flexible rings 134 retained on outer walls of the two flexible fitting elements 133, and a second locking bolt 135 inserted into the coupling portion 131 and the coupling sleeve 132.

The rotation unit 20 is rotatably connected with the first connection tab 11 and the second connection tab 12 of the fixing mount 10, and the rotation unit 20 includes a rotatable seat 21 and at least one abutting element 22 (in this embodiment, the rotation unit 20 includes two abutting elements 22), wherein the rotatable seat 21 has a rotating portion 211 and a connecting portion 212 connecting with the rotating portion 211, and the rotating portion 211 has a first aperture 2111 and at least one accommodation groove 2112 defined on at least one side of the rotating portion 211 (in this embodiment, the rotating portion 211 has two accommodation grooves 2112 defined on two sides thereof respectively), wherein the connecting portion 212 has a trough 2121 defined in an end thereof and communicating with the accommodation groove 2112, and the two abutting elements 22 are fitted in the accommodation groove 2112, wherein each of the abutting element 22 has a forcing portion 221 corresponding to the trough 2121, and the forcing portion 221 has an arcuately convex cross section, wherein the forcing portion 221 retains with the trough 2121 and has a second aperture 222 corresponding to the first aperture 2111.

The mirror 30 includes a post 31 being cylindrical and extending outwardly from a side thereof, and the post 31 has a peripheral trench 311, a cross section of which is arcuately concave, wherein the post 31 is accommodated in the trough 2121 of the connecting portion 212 of the rotatable seat 21 so that the forcing portion 221 matingly contacts with the peripheral trench 311.

The first locking bolt 40 is screwed with the threaded orifice 121 of the second connection tab 12 of the fixing mount 10 via the through orifice 111 of the first connection tab 11 of the fixing mount 10, the first aperture 2111 of the rotating portion 211 of the rotatable seat 21, and the second aperture 222 of each abutting element 22, hence when the first locking bolt 40 is rotated tightly, it drives the first connection tab 11 and the second connection tab 12 of the fixing mount 10 to move close to each other so that the first connection tab 11 and the second connection tab 12 force the rotation unit 20, thus fixing the rotation unit 20 and the fixing mount 10. In addition, each abutting element 22 is driven by the first connection tab 11 or the second connection tab 12 to contact with the peripheral trench 311 of the post 31 of the mirror 30 by using the forcing portion 221, thus fixing the mirror 30 and the rotation unit 20 together.

Figure 6:
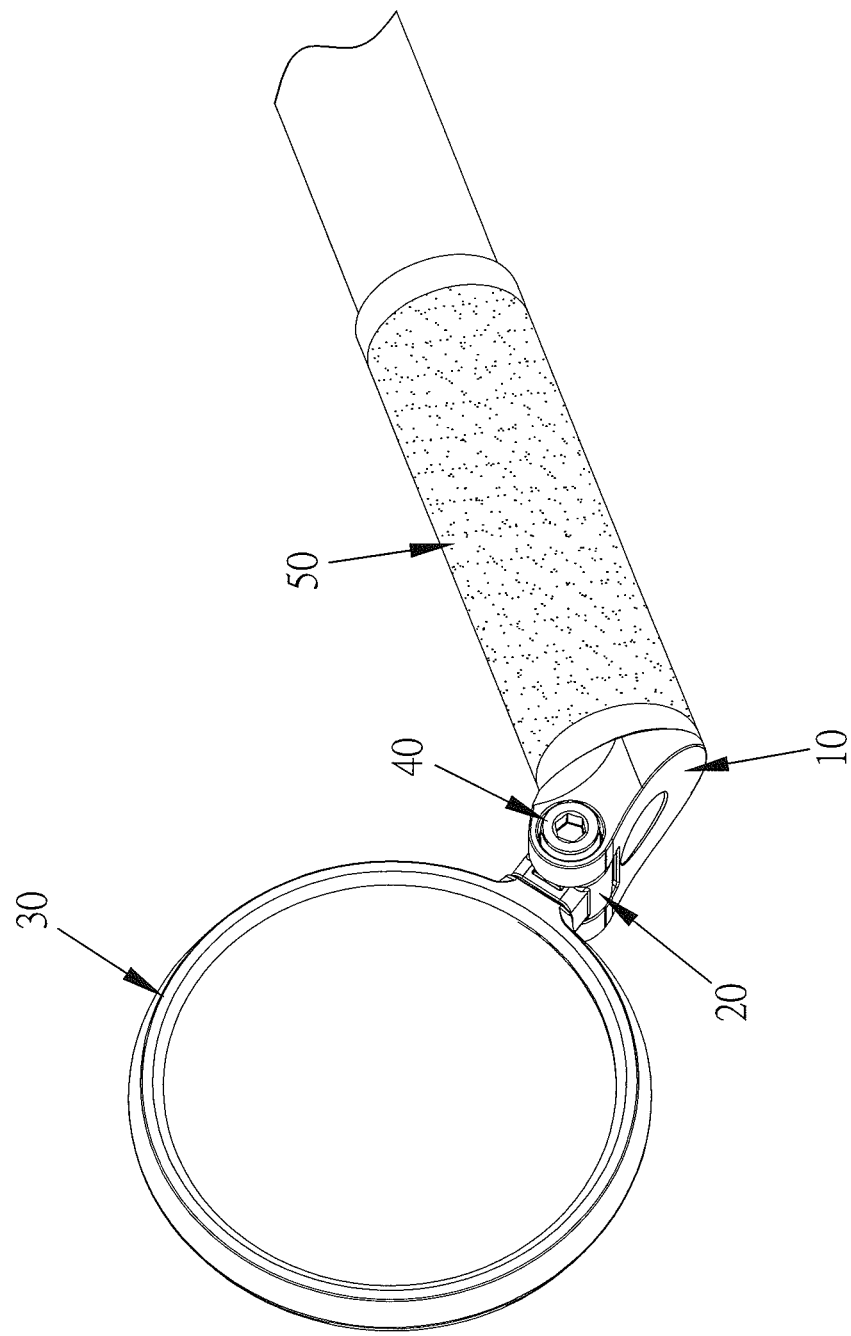
FIG. 6 is a perspective view showing the application of the rearview mirror structure for the vehicle in accordance with the first embodiment of the present invention.
Figure 7:
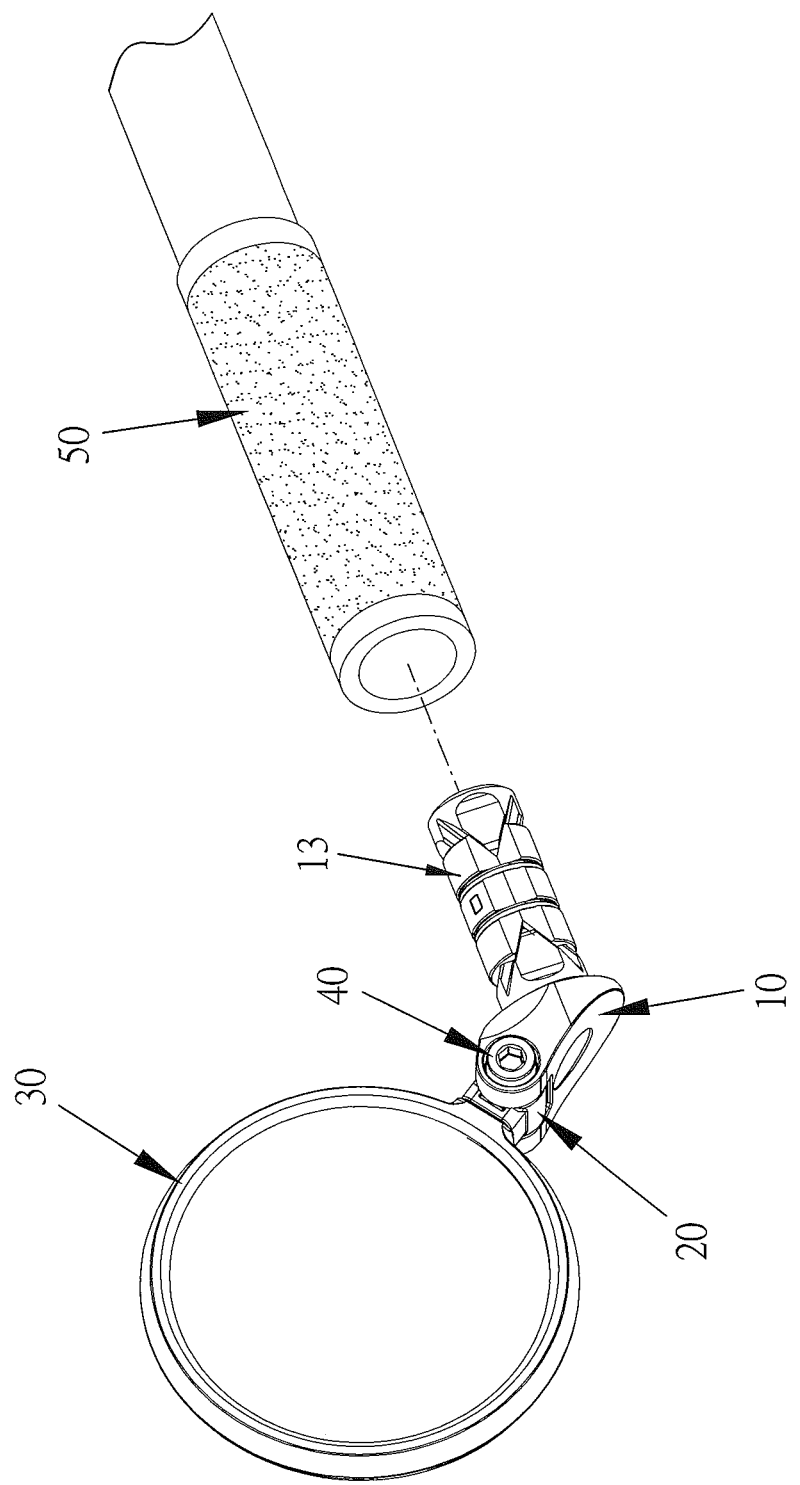
FIG. 7 is a perspective view showing the application of the rearview mirror structure for the vehicle in accordance with the first embodiment of the present invention.
Figure 8:
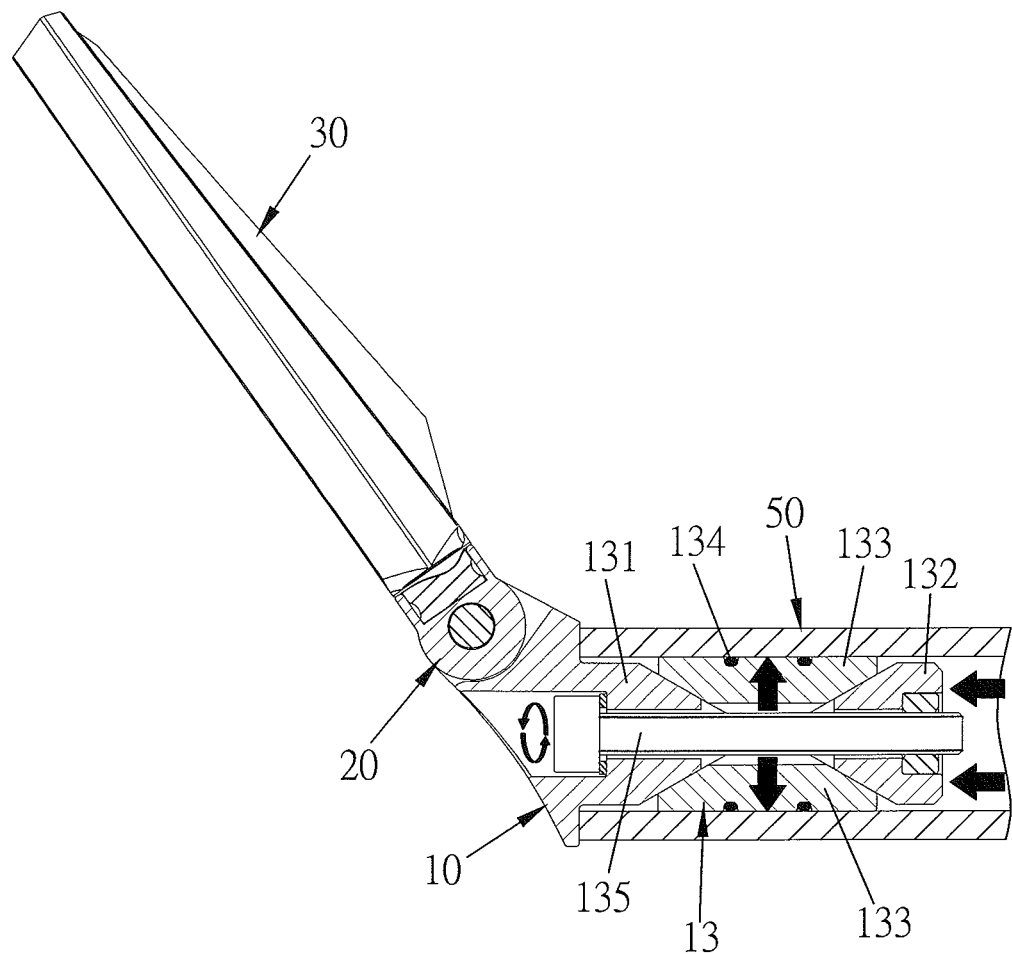
FIG. 8 is a cross sectional view showing the application of the rearview mirror structure for the vehicle in accordance with the first embodiment of the present invention.

In application, as illustrated in FIGS. 6-8, the fixer 13 of the fixing mount 10 is inserted into a hollow tube 50 of the vehicle, and the second locking bolt 135 is rotated tightly to drive the coupling sleeve 132 to move toward the coupling portion 131, hence the two flexible fitting elements 133 are forced by the coupling portion 131 and the coupling sleeve 132 to abut against an inner wall of the hollow tube 50 of the vehicle, thus connecting the fixing mount 10 with the hollow tube 50.

Figure 9:
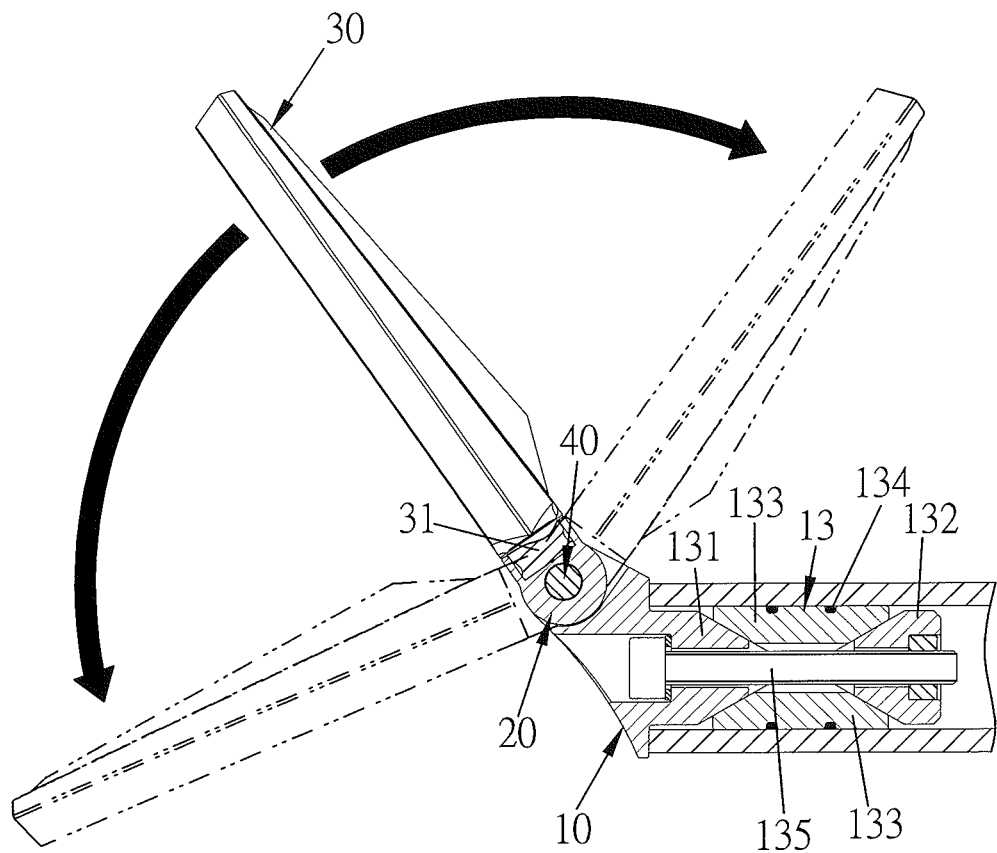
FIG. 9 is a cross sectional view showing the application of the rearview mirror structure for the vehicle in accordance with the first embodiment of the present invention.
Figure 10:
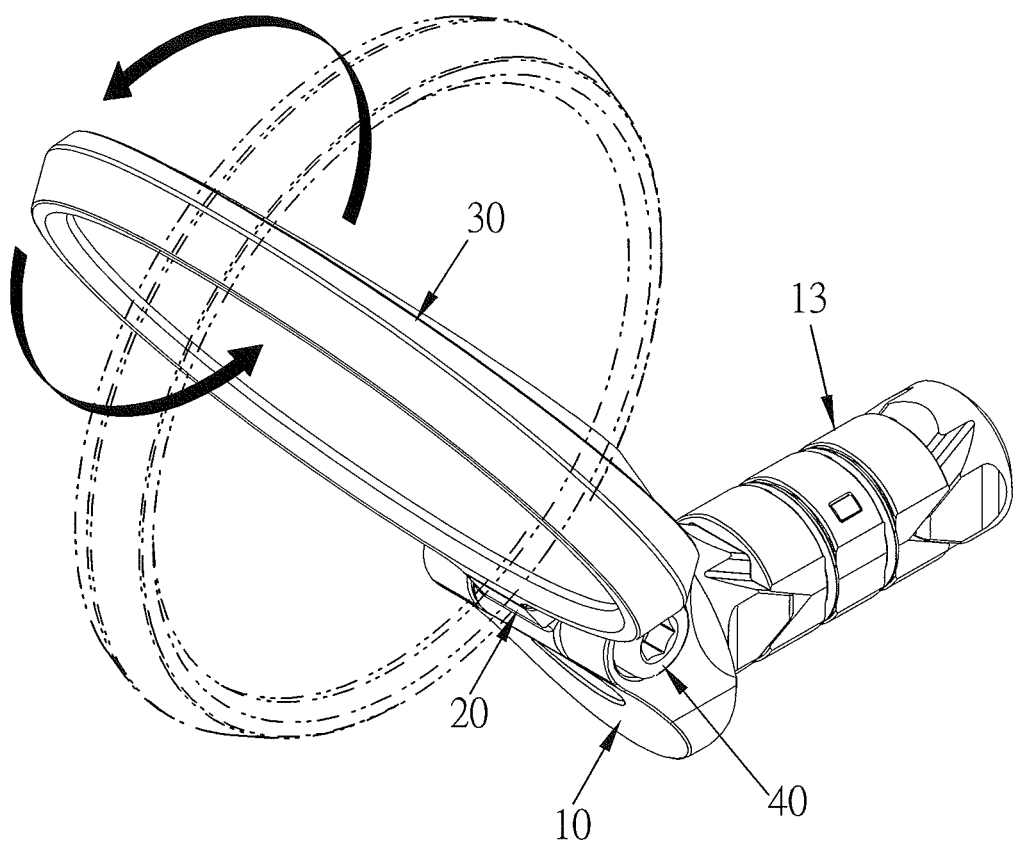
FIG. 10 is a perspective view showing the application of the rearview mirror structure for the vehicle in accordance with the first embodiment of the present invention.

As adjusting an angle of the rearview mirror structure, the first locking bolt 40 is rotated loosely so that the first connection tab 11 and the second connection tab 12 do not force the rotation unit 20, thus fixing the rotation unit 20 and the fixing mount 10, and the forcing portion 221 of each abutting element 22 does not contact with the peripheral trench 311 of the post 31 of the mirror 30, as shown in FIG. 9, thus adjustably rotating the rotation unit 20 and the mirror 30 along the first locking bolt 40 to a desired angle. Referring to FIG. 10, the mirror 30 is freely rotated at 360 degrees in the trough 2121 of the connecting portion 212 of the rotatable seat 21 of the rotation unit 20 along the post 31. Thereafter, the first locking bolt 40 is rotated tightly so that the first connection tab 11 and the second connection tab 12 forces the rotation unit 20, thus fixing the rotation unit 20 and the fixing mount 10. Furthermore, the forcing portion 221 of each abutting element 22 contacts with the peripheral trench 311 of the post 31 of the mirror 30, thus fixing the mirror 30 and the rotation unit 20 together.

Figure 11:
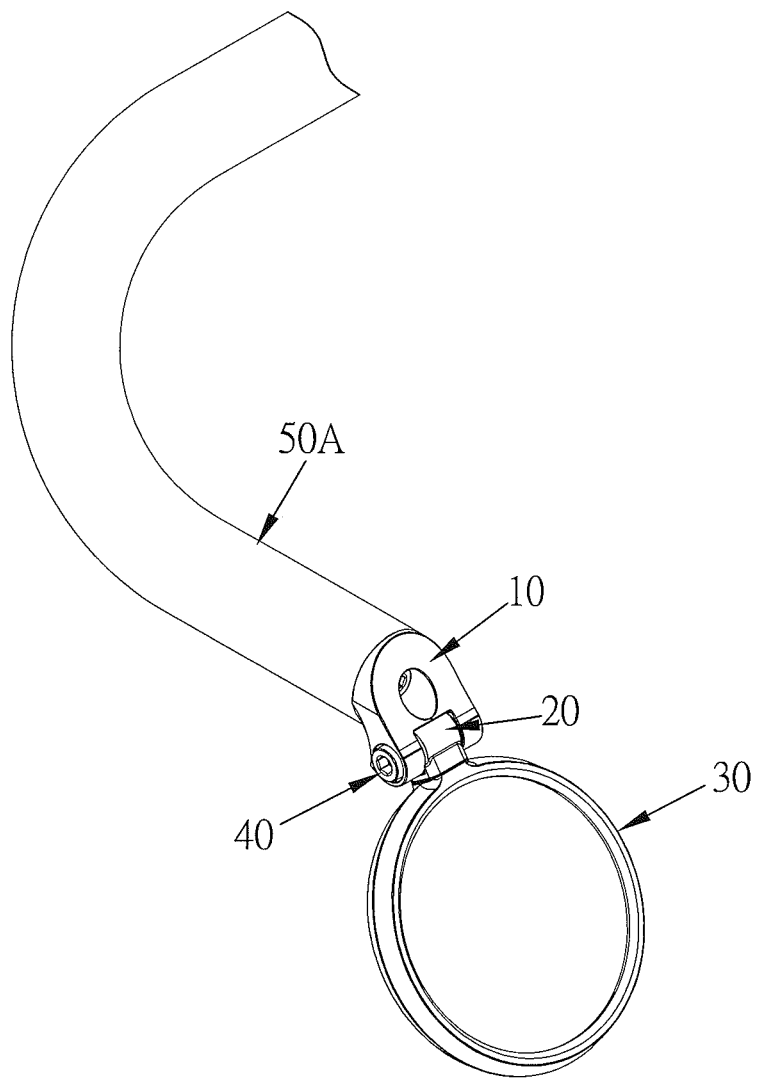
FIG. 11 is a perspective view showing the application of the rearview mirror structure for the vehicle in accordance with the present invention.
Figure 12:
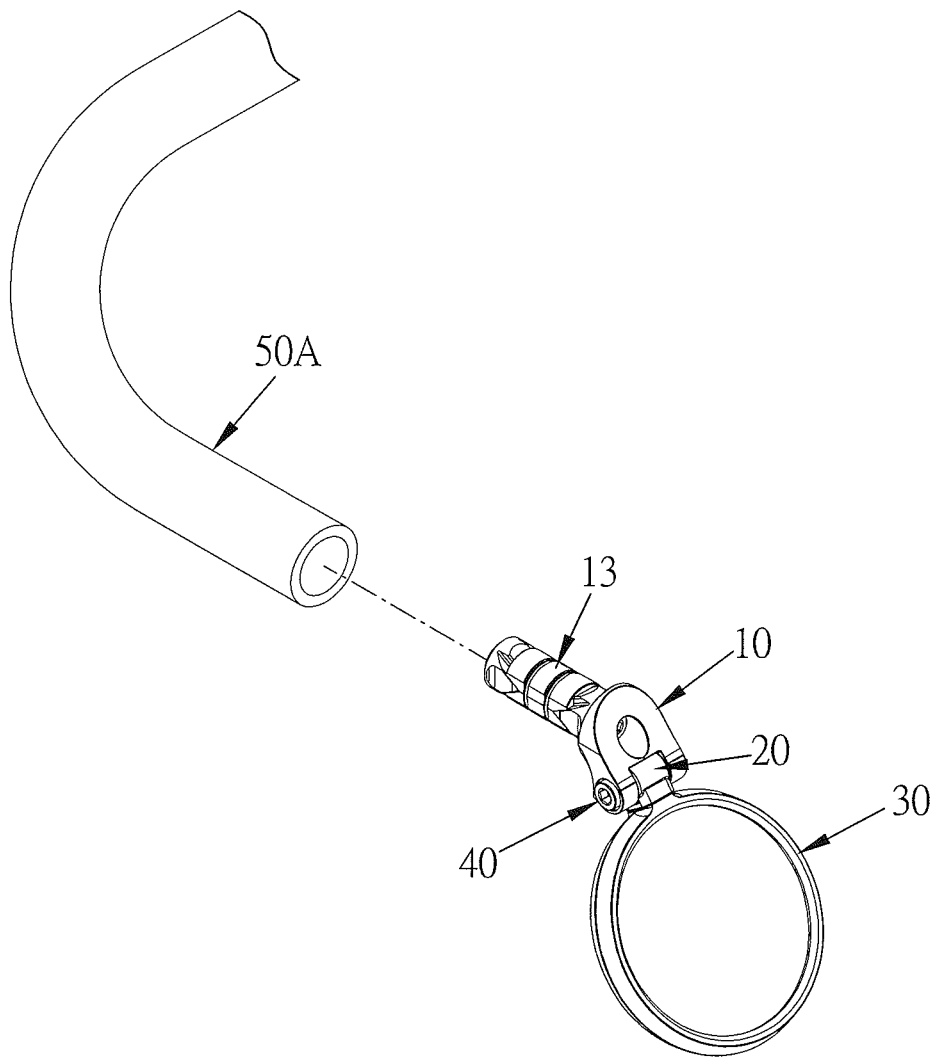
FIG. 12 is a perspective view showing the application of the rearview mirror structure for the vehicle in accordance with the present invention.

With reference to FIGS. 6 and 7, the rearview mirror structure is connected with the hollow tube 50 of the vehicle, wherein the hollow tube 50 is straight. Referring to FIGS. 11 and 12, the rearview mirror structure is connected with a hollow tube 50A of the vehicle, wherein the hollow tube 50A is curved.

Thereby, the rearview mirror structure of the present invention has advantages as follows:

1. The first locking bolt 40 is rotated tightly or loosely so that the first connection tab 11 and the second connection tab 12 of the fixing mount 10 move close to each other to force the rotation unit 20, thus fixing or adjustably rotating the rotation unit 20 and the fixing mount 10. Furthermore, the forcing portion 221 of each abutting element 22 contacts with the peripheral trench 311 of the post 31 of the mirror 30, thus fixing or adjustably rotating the mirror 30 and the rotation unit 20. In other words, the first locking bolt 40 is rotated tightly or loosely to fix or adjustably rotate the rearview mirror structure, thus saving an operation space and a size of the rearview mirror structure.

2. The first locking bolt 40 is rotated loosely so as to adjustably rotate an angle of the rotation unit 20 and the mirror 30 and an angle of the mirror 30, thus increasing an adjustable angle range of the rearview mirror structure. Thereafter, the first locking bolt 40 is rotated tightly so as to secure the mirror 30 stably during the vehicle runs.

While various embodiments in accordance with the present invention have been shown and described, it is clear to those skilled in the art that further embodiments may be made without departing from the scope of the present invention.

What is claimed is:

1. A rearview mirror structure for vehicle comprising:
   a fixing mount including a first connection tab and a second connection tab which are formed on a first end of the fixing mount, the first connection tab having a through orifice, and the second connection tab having a threaded orifice corresponding to the through orifice, the fixing mount further including a fixer mounted on a second end of the fixing mount;
   a rotation unit rotatably connected with the first connection tab and the second connection tab of the fixing mount, and the rotation unit including a rotatable seat and at least one abutting element, wherein the rotatable seat has a rotating portion and a connecting portion connecting with the rotating portion, and the rotating portion has a first aperture and at least one accommodation groove defined on at least one side of the rotating portion, wherein the connecting portion has a trough defined in an end thereof and communicating with the accommodation groove, and the at least one abutting element is fitted in the accommodation groove, wherein each of the at least one abutting element has a forcing portion corresponding to the trough, and the forcing portion retains with the trough and has a second aperture corresponding to the first aperture;
   a mirror including a post extending outwardly from a side of the mirror, and the post having a peripheral trench and accommodated in the trough of the connecting portion of the rotatable seat so that the forcing portion matingly contacts with the peripheral trench; and
   a first locking bolt screwed with the threaded orifice of the second connection tab of the fixing mount via the through orifice of the first connection tab of the fixing mount, the first aperture of the rotating portion of the rotatable seat, and the second aperture of each abutting element, hence when the first locking bolt is rotated tightly, it drives the first connection tab and the second connection tab of the fixing mount to move close to each other so that the first connection tab and the second connection tab force the rotation unit,
   wherein when the first locking bolt is loosely rotated:
   the second connection tab clips the at least one abutting element allowing the mirror to adjustably swing along the first locking bolt to a desired angle, and
   the at least one abutting element contacts the post allowing the mirror to rotate 360° in the trough of the connecting portion of the rotatable seat, and
   wherein when the first locking bolt is tightly rotated, the first connection tab and the second connection tab force the rotation unit thereby fixing the rotation unit and the fixing mount, and the forcing portion of each of the at least one abutting elements contact the peripheral trench thereby fixing the mirror and the rotation unit,
   the first locking bolt thus fixing or adjustably rotating the rotation unit and the fixing mount, wherein each abutting element is driven by the first connection tab or the second connection tab to contact with the peripheral trench of the post of the mirror by using the forcing portion, thus fixing or adjustably rotating the mirror and the rotation unit together.

2. The rearview mirror structure as claimed in claim 1, wherein the threaded orifice of the second connection tab is one-piece formed with the second connection tab.

3. The rearview mirror structure as claimed in claim 1, wherein the threaded orifice of the second connection tab of the fixing mount forms in a screw nut which is accommodated in the second connection tab.

4. The rearview mirror structure as claimed in claim 1, wherein the post is cylindrical.

5. The rearview mirror structure as claimed in claim 1, wherein the forcing portion has an arcuately convex cross section, and a cross section of the peripheral trench is arcuately concave.

* * * * *